April 14, 1970     M. F. MOULTON     3,505,883
GYROSCOPIC SYSTEMS

Filed Nov. 8, 1967     2 Sheets-Sheet 1

INVENTOR

MALCOLM F. MOULTON

United States Patent Office 3,505,883
Patented Apr. 14, 1970

3,505,883
GYROSCOPIC SYSTEMS
Malcolm F. Moulton, London, England, assignor to Elliott Brothers (London) Limited, Lewisham, London, a British company
Filed Nov. 8, 1967, Ser. No. 681,376
Claims priority, application Great Britain, Nov. 10, 1966, 50,478/66
Int. Cl. G01c 19/28
U.S. Cl. 74—5.6
6 Claims

ABSTRACT OF THE DISCLOSURE

A self-monitoring aircraft gyroscopic system applicable to a gyroscope rotor spinning on a gas bearing. Capacitor pick-offs sense the gap between the rotor and the gyroscope frame in two axes at right angles to the spinning axis and together with servomotors on the gyroscope gimbal ring pivots, form two closed loop servosystems for detecting relative movement between the rotor and the frame.

Figure 1:
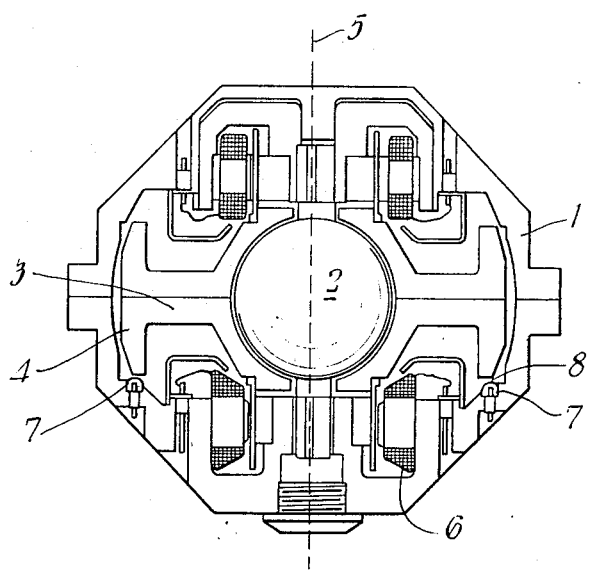

There are also means for generating duplicated output signals on the occurrence of angular movement of the frame relative to the aircraft.

---

This invention relates to improvements in gyroscopic systems used either for giving visual indications to the pilot of an aircraft or for the control of an automatic pilot or for any application giving rise to similar problems. The invention is concerned with the use of a gas-bearing gyroscope as a self-monitoring attitude reference.

According to the invention a self-monitoring gyroscopic attitude reference system responsive to angular movements of an aircraft about two axes at right angles to one another comprises a gyroscope rotor spinning about a further axis normally (in straight level flight) at right angles to both of said axes supported by a film of gas about a single spherical bearing which as a whole is mounted in a frame which is supported by gimbal rings allowing freedom about both of the said two axes, means comprising closed loop servo systems for slaving the frame about both of the said axes in order to tend to maintain an axis of the frame in approximate alignment with the gyroscope rotor spinning axis, means for generating alarm signals should such alignment not be maintained within a predetermined threshold, means for generating duplicated output signals on the occurrence of angular movements of the frame relative to the aircraft about both of said axes, and means for generating alarm signals should a difference occur above a predetermined threshold between the members of each said duplicated pair.

The output signal generating means are preferably synchros mounted on the gimbal ring pivots. In the preferred construction the gyroscope rotor has an outer flange and there is a small clearance between this flange and the inside of the frame. Capacitor pick-off electrodes are mounted in the frame at two points lying one in each of two perpendicular planes, one plane containing the pitch gimbal ring axis and the other containing the roll gimbal ring axis, the pick-offs being responsive to the gap between the rotor flange and the frame. The pitch and roll gimbal ring pivots each carry a servo motor and each capacitor pick-off electrode is connected to its respective servo motor through an amplifier and a shaper, thus forming two closed loop servo systems which detect any relative movement between the rotor and the frame. If any signal so generated exceeds a predetermined threshold value an alarm signal is given which can fulfill any required purpose such as disconnecting an autopilot or giving a visual signal to the pilot of the aircraft. The output signals similarly can control an autopilot or give visual indications.

Since the rotor and gimbal rings assembly form an integral unit there are far fewer failure modes than with conventional types of gyro and studies indicate that the system of the invention, plus rotor speed monitoring by known methods, is capable of the detection of all failures.

Another significant additional property of the system is that, by mounting the gyro case with the spinning axis in the horizontal plane, a monitored directional reference can be obtained.

Figure 2:
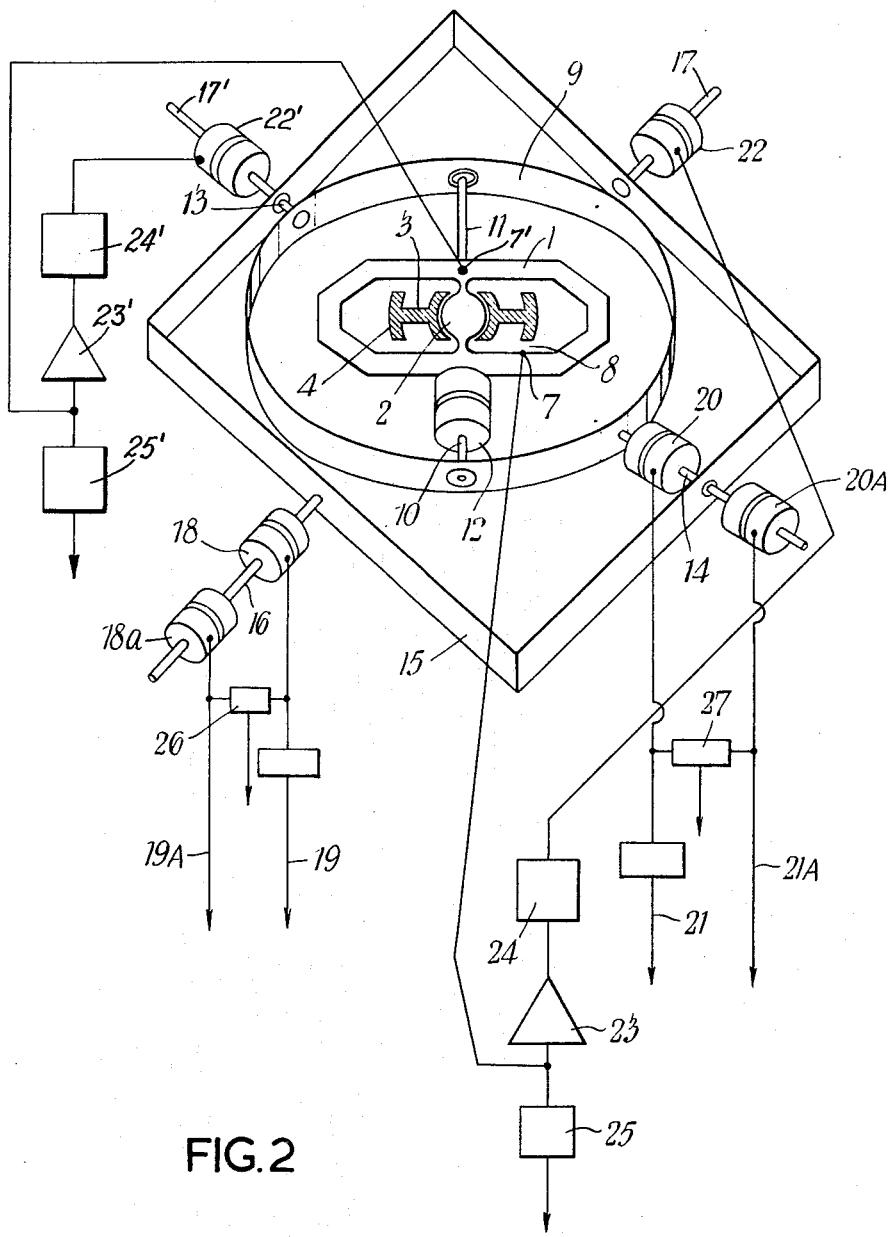

The invention will now be further described by way of example with reference to the accompanying drawings, in which:

FIGURE 1 is a cross-section of a typical gyro unit; and
FIGURE 2 is a diagrammatic view of the system showing the arrangement of one of the closed loop servos.

Referring to FIGURE 1, a frame 1 encloses a fixed spherical bearing 2. A gyro rotor 3 having an outer flange 4 spins on this bearing about an axis 5 and is supported on a film of gas between the rotor and the bearing. The frame carries an induction motor stator winding 6, the gyro rotor 3 acting as the rotor of the induction motor. The position of the rotor relative to the frame is monitored by capacitor pick-offs two of which are shown at 7 located on the frame at a point where the gap 8 between the rotor and the frame is very small. The other pick-offs 7′ are diagrammatically illustrated in FIG. 2. The pick-offs 7 are responsive to variations in the gap 8 and the pick-offs 7 and 7′ are so located as to be responsive to angular movements of the rotor relative to the frame about two axes at right-angles both to one another and to the rotor spinning axis 5.

Turning now to FIGURE 2, the same reference numerals are used wherever appropriate. The frame 1 is mounted in a pitch gimbal ring 9. The figure shows the frame pivotally mounted in the gimbal ring on shafts 10 and 11 as is necessary when frame or case rotation is required, such rotation being sensed by a synchro 12. However, for the purposes of the present description it can be assumed that the frame 1 is rigidly mounted in the gimbal ring 9. This gimbal ring is carried on shafts 13 and 14 pivotally mounted in a roll gimbal ring 15 which is itself carried on shafts 16 and 17 pivotally mounted in the aircraft.

Duplicated synchros 18 and 18A mounted on the shaft 16 provide duplicated roll output signals which are fed into lines 19 and 19A. These signals are monitored by a comparator 26 which gives an alarm signal if the two output signals differ by more than a predetermined threshold. Similarly, synchros 20 and 20A mounted on the shaft 14 provide duplicated pitch output signals feeding into lines 21 and 21A and monitored by a comparator 27.

A capacitor pick-off electrode 7 is mounted in the frame 1 in such a position as to be responsive to such variations in the gap 8 between the rotor flange 4 and the flame as are caused by angular movements of the rotor relative to the frame about the axis of roll. The shaft 17 carries a servo motor 22 and a closed loop servo system is created by connecting together the pick-off electrode 7 and the servo motor 22 by way of an amplifier 23 and a shaper 24. A similar servo system driven by the pick-off 7′ is arranged so as to detect rotor movements about the angle of the pitch and is illustrated with primed reference characters corresponding to the roll axis system.

When all parts of the system are functioning correctly, the gyro will issue output signals in the conventional manner. When a fault condition occurs, an alarm output is activated by a digital monitor logical circuit 25 connected to the servo loop, provided that the error is above a predetermined threshold value.

This description is mainly directed to the usual orientation of the system, that is to say with the normal spinning axis vertical and the system being responsive to angular movements of the aircraft about the conventional pitch and roll axes. This, however, only applies to the preferred embodiment and the system is equally viable when applied to any three orthogonal axes.

I claim:
1. A self-monitoring gyroscopic attitude reference system responsive to angular movement of an aircraft about two mutually perpendicular axes comprising, in combination:

a frame including a spherical bearing, a gyro rotor journalled on said bearing for rotation about a spin axis orthogonally related to said two axes when the aircraft is in level flight, said bearing and said rotor being constructed to allow limited angular displacements of said rotor with respect to said frame, inner and outer gimbal rings allowing freedom of said frame about said two axes, first pick-off means for detecting angular displacements of said rotor in one plane with respect to said frame and having an output signal proportional to such displacements, second pick-off means for detecting angular displacements of said rotor with respect to said frame in a plane perpendicular to said one plane and having an output signal proportional to such displacements, torquer means connected to said inner and outer gimbal rings, first and second servo loop means connecting said pick-off means to said torquer means for precessing said rotor to maintain its spin axis in predetermined relation to said frame, means for generating output signals proportional to angular movements of said frame relative to the aircraft about each of said two axes, and means for generating alarm signals in response to output signals from said first and second pick-off means which exceed predetermined threshold values therefor.

2. The attitude reference system according to claim 1 wherein each means for generating includes a pair of similar signal generators, each having an output signal proportional to the angular displacements of the frame relative to the aircraft about a respective axis, and comparator means for generating an alarm signal when the output signals of each pair of signal generators differ by more than a predetermined value.

3. The attitude reference system according to claim 2 wherein said first and second pick-off means comprise capacitor pick-off electrodes responsive to clearance between said rotor and said frame.

4. The attitude reference system according to claim 1 wherein said one plane and said plane perpendicular thereto contain respective ones of said two axes.

5. A system according to claim 2 in which said two axes are the aircraft pitch and roll axes.

6. A system according to claim 5 having means whereby said gyroscope rotor spinning axis is normally in a horizontal plane so that a monitored directional reference can be obtained.

References Cited
UNITED STATES PATENTS

| | | | |
|---|---|---|---|
| 2,433,837 | 1/1948 | Dawson | 74—5 XR |
| 2,968,957 | 1/1961 | Condie et al. | 74—5.6 XR |
| 2,991,659 | 7/1961 | Bowden | 74—5.6 |
| 2,995,934 | 8/1961 | Adams et al. | 74—5 XR |
| 3,254,419 | 6/1966 | Hurlburt | 74—5 XR |
| 3,276,267 | 10/1966 | Lindberg et al. | 74—5 XR |

FRED C. MATTERN JR., Primary Examiner

M. A. ANTONAKAS, Assistant Examiner

U.S. Cl. X.R.

74—5